United States Patent
Kashiwagi et al.

(10) Patent No.: US 9,692,877 B2
(45) Date of Patent: Jun. 27, 2017

(54) PORTABLE TERMINAL AND METHOD FOR CONTROLLING SAME

(71) Applicant: Sharp Kabushiki Kaisha, Osaka-shi, Osaka (JP)

(72) Inventors: Tohru Kashiwagi, Osaka (JP); Michiaki Satou, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/026,097

(22) PCT Filed: Sep. 30, 2014

(86) PCT No.: PCT/JP2014/076120
§ 371 (c)(1),
(2) Date: Mar. 30, 2016

(87) PCT Pub. No.: WO2015/050127
PCT Pub. Date: Apr. 9, 2015

(65) Prior Publication Data
US 2016/0234374 A1    Aug. 11, 2016

(30) Foreign Application Priority Data
Oct. 1, 2013 (JP) .................................. 2013-206851

(51) Int. Cl.
*H04M 1/00* (2006.01)
*H04M 1/725* (2006.01)
(Continued)

(52) U.S. Cl.
CPC ... *H04M 1/72569* (2013.01); *H04M 1/72522* (2013.01); *H04W 52/0209* (2013.01);
(Continued)

(58) Field of Classification Search
CPC .... H04M 1/72; H04M 1/569; H04M 1/72522; H04M 1/0202; H04M 1/0281; H04M 2250/12; Y02B 60/50; H04W 52/0209
(Continued)

(56) References Cited

U.S. PATENT DOCUMENTS

2009/0233650 A1    9/2009    Hosono
2012/0162110 A1    6/2012    Kobayashi

FOREIGN PATENT DOCUMENTS

| JP | 2009-217612 A | 9/2009 |
| JP | 2011-119959 A | 6/2011 |
| JP | 2012-137859 A | 7/2012 |

OTHER PUBLICATIONS

Official Communication issued in International Patent Application No. PCT/JP2014/076120, mailed on Jan. 13, 2015.

*Primary Examiner* — Wayne Cai
(74) *Attorney, Agent, or Firm* — Keating & Bennett, LLP

(57) ABSTRACT

To reduce the number of erroneous detections and power consumption and increase the speed of a response to an operation, a portable terminal (10) includes (i) a determining unit (22) configured to determine whether a sensing signal output from at least one of a first electrode (1A) and a second electrode (1B) has an absolute value of not less than a first threshold or not greater than a second threshold and (ii) a determination period control unit (23) configured to perform a process of shortening a determination cycle in a case where the determining unit has initially determined that the absolute value of the output is not less than the first threshold or in a case where the determining unit has initially determined that the absolute value of the output is not greater than the second threshold.

5 Claims, 7 Drawing Sheets

(51) Int. Cl.
*H04W 52/02* (2009.01)
*H04M 1/02* (2006.01)

(52) U.S. Cl.
CPC ........ *H04M 1/0202* (2013.01); *H04M 1/0281* (2013.01); *H04M 2250/12* (2013.01); *Y02B 60/50* (2013.01)

(58) Field of Classification Search
USPC .......................... 455/574, 550.1, 67.11, 41.1
See application file for complete search history.

PORTABLE TERMINAL AND METHOD FOR CONTROLLING SAME

TECHNICAL FIELD

The present invention relates to a portable terminal configured to sense a contact or separation of a hand and to a method for controlling the portable terminal.

BACKGROUND ART

There has been a type of portable terminal including contact sensors on opposite side surfaces of a casing. An example of such portable terminals is a portable terminal disclosed in Patent Literature 1. This portable terminal is configured as follows: The entire region of each of the contact sensors is divided into a plurality of sensor regions. The portable terminal determines, on the basis of the number of ON signals supplied for each sensor region, the number of fingers (thumb) touching each contact sensor. The portable terminal performs different processes in correspondence with the determined number of fingers (thumb). This configuration allows for an increase in the number of determinable patterns of how the casing is being held.

CITATION LIST

Patent Literature 1
Japanese Patent Application Publication, Tokukai, No. 2011-119959 A (Publication Date: Jun. 16, 2011)

SUMMARY OF INVENTION

Technical Problem

The above portable terminal disclosed in Patent Literature 1 is, however, problematic as follows: For example, the increase in the number of determinable patterns leads to an increase in the number of erroneous detections of determination operations. Further, the portable terminal is not particularly configured at all to, for example, reduce the time period necessary for a determination operation. The portable terminal thus does not consume less power, and may undesirably be slow in responding to an operation.

The present invention has been accomplished in view of the above problem. It is an object of the present invention to provide, for example, a portable terminal that has reduced the number of erroneous detections, consumes less power, and responds quickly to an operation.

Solution to Problem

In order to solve the above problems, a portable terminal according to an aspect of the present invention is a portable terminal including: at least one contact sensor disposed at a position with which a hand of a user's comes into contact in a case where the hand holds a casing of the portable terminal; a determining section configured to perform, a plurality of times, a process of determining whether a sensing signal output from the at least one contact sensor has an absolute value of (i) not less than a first threshold for determining a contact of a hand or (ii) not greater than a second threshold for determining a separation of a hand; and a determination period control section configured to perform either (i) a process of, in a case where the determining section has initially determined that the absolute value of the output is not less than the first threshold, shortening a first cycle of the determination of a contact of a hand so that the first cycle is shorter than before the initial determination or (ii) a process of, in a case where the determining section has initially determined that the absolute value of the output is not greater than the second threshold, shortening a second cycle of the determination of a separation of a hand so that the second cycle is shorter than before the initial determination.

Advantageous Effects of Invention

An aspect of the present invention can advantageously provide a portable terminal that has reduced the number of erroneous detections, consumes less power, and responds quickly to an operation.

DESCRIPTION OF EMBODIMENTS

The description below deals with embodiments of the present invention with reference to FIGS. 1 through 7. The description below deals with a main part of the configuration of each specific embodiment, so the other part is not described. In the case where such other part of the configuration is described for any other embodiment, it is as so described. Further, for convenience of description, any member having a function identical among different embodiments is assigned a common reference sign, and a description of such a member is omitted as appropriate.

[Portable Terminal 10]

Figure 1:
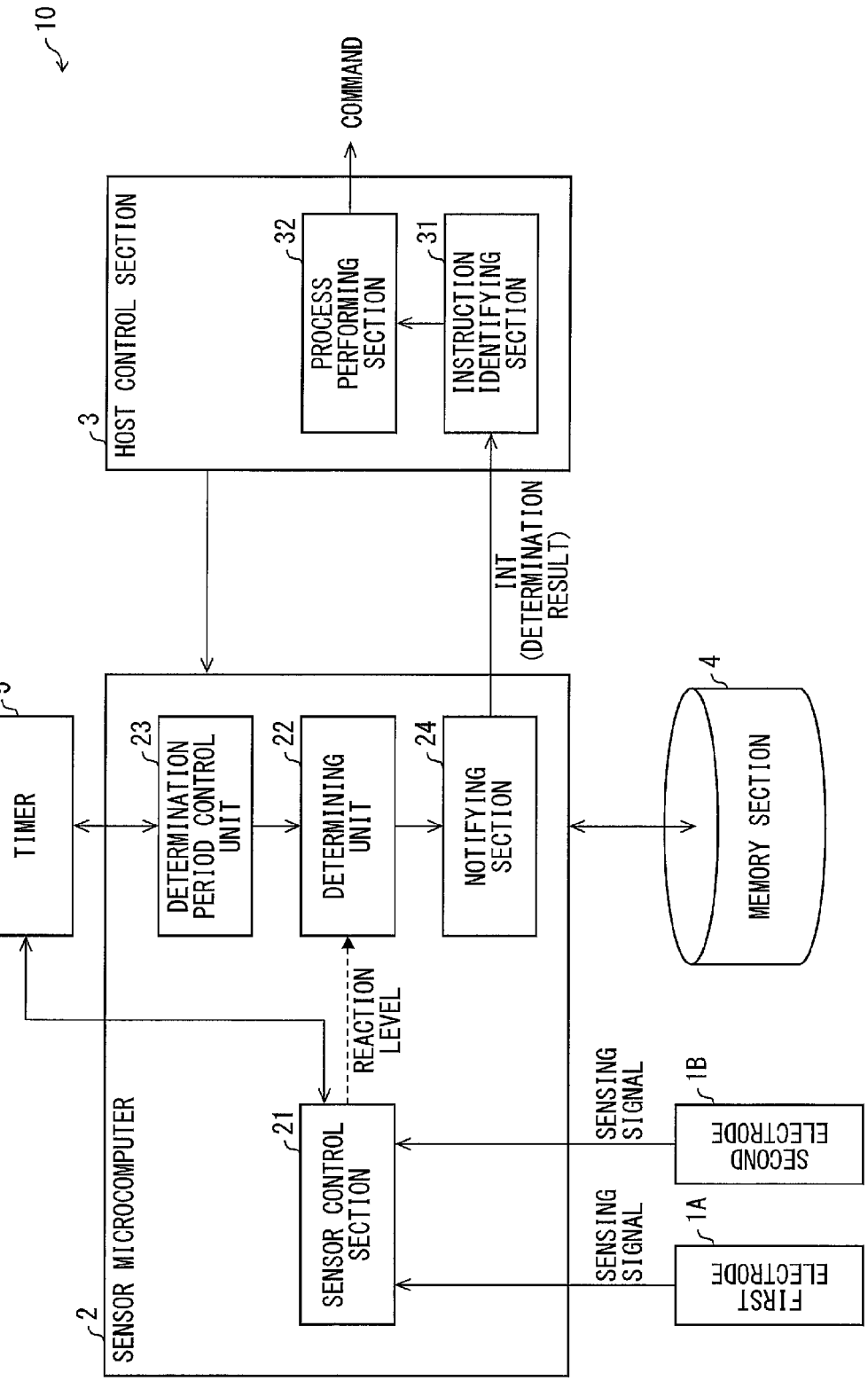
FIG. 1 is a block diagram illustrating an outline of a configuration of a portable terminal according to an embodiment of the present invention.
Figure 2:
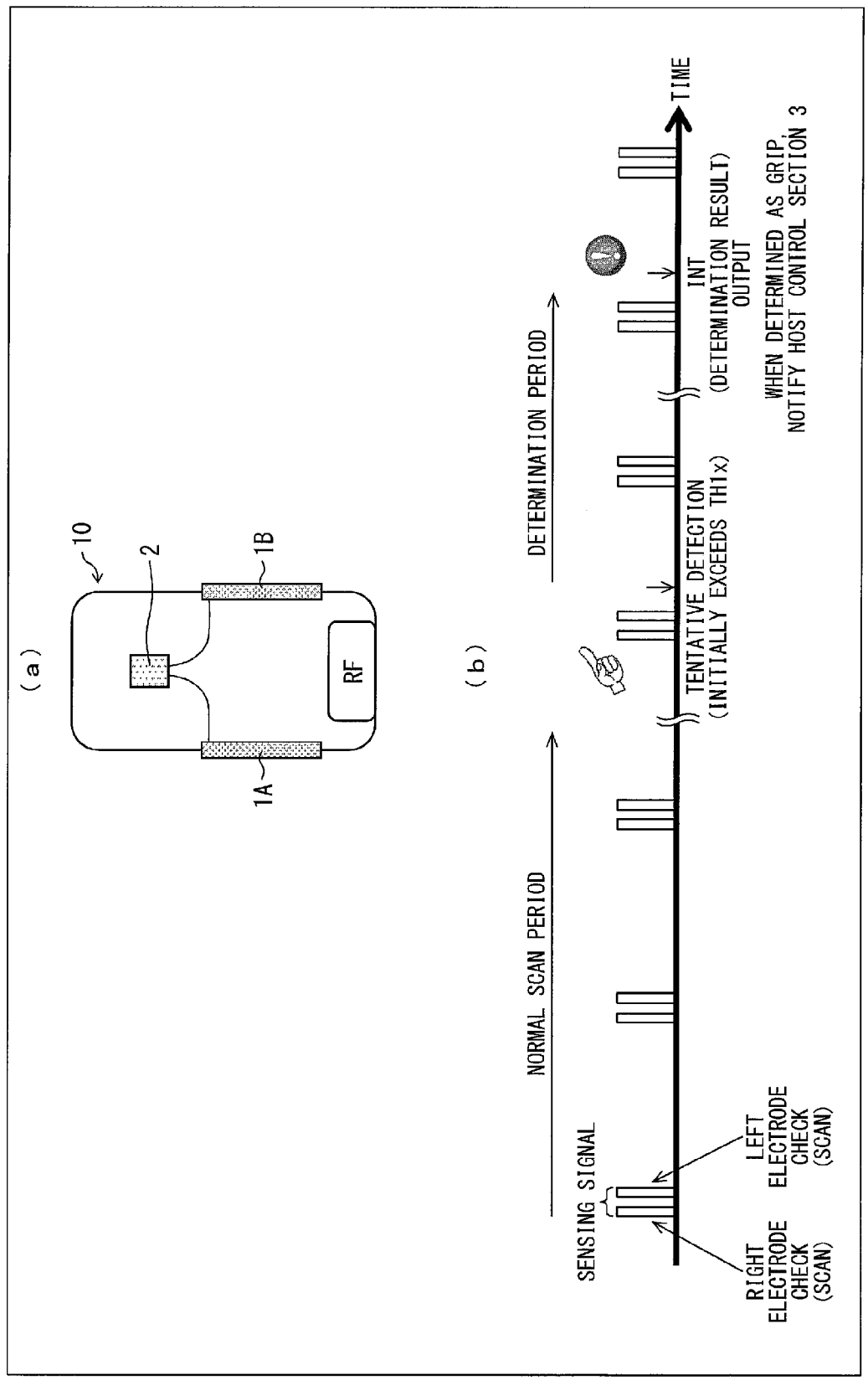
FIG. 2 provides diagrams illustrating an appearance of the portable terminal and an outline of an operation of the portable terminal, where (a) is a diagram illustrating an appearance of the portable terminal, and (b) is a timing chart illustrating a flow of a preconditioned operation of the portable terminal.

FIG. 1 is a block diagram illustrating an outline of a configuration of a portable terminal 10 according to an embodiment of the present invention. (a) of FIG. 2 is a diagram illustrating an appearance of the portable terminal 10. The portable terminal 10, as illustrated in FIG. 1, includes a first electrode (contact sensor) 1A, a second electrode (contact sensor) 1B, a sensor microcomputer 2, a host control section 3, a memory section 4, and a timer 5. The portable terminal 10 is a system including a grip sensor provided with a sensor microcomputer 2 as illustrated in (a) of FIG. 2. The first electrode 1A and the second electrode 1B are disposed as part of the grip sensor at respective positions at which a user's hand holding the casing of the portable terminal 10 is in contact with the portable terminal 10. The portable terminal 10 can thus perform a user interface (UI) function; for example, the portable terminal 10 can cause a display section (not shown in the drawings) to start displaying an image in response to a user touching the two electrodes.

With reference to (b) of FIG. 2, the description below deals with an outline of an operation of the portable terminal 10 (for a case of only determining whether the housing of the portable terminal 10 has been gripped). As illustrated in (b) of FIG. 2, the portable terminal 10 has an operation period roughly divided into a "normal scan period" and a "determination period". The expression "scan (or check)" refers to obtaining information about a reaction level (that is, the absolute value of a sensing signal outputted from each contact sensor) based on a sensing signal indicative of a contact of a hand which sensing signal is outputted from each of the first electrode 1A (that is, the electrode on the right side when the user views the display section while normally holding the casing of the portable terminal 10) and the second electrode 1B (that is, the electrode on the left side when the user views the display section while normally holding the casing of the portable terminal 10).

The operation period transitions from the "normal scan period" to the "determination period" in a case where a scan has initially obtained a reaction level exceeding a threshold THx1 (see FIG. 3) described later (this scan is referred to as "tentative detection"). Subsequently, during the "determination period", the portable terminal 10, for example, determines whether the user has started to hold (grip) the casing. In a case where the portable terminal 10 has determined that the user has started to grip the casing, the portable terminal 10 notifies the host control section 3 of the determination result. This configuration allows the portable terminal 10 to recognize a grip by the user. Further, the portable terminal 10 performs a scan during the "determination period" at a higher speed than during the "normal scan period". Stated differently, a scan during the "normal scan period" has a cycle (determination cycle) longer than the cycle of a scan during the "determination period". The description below deals with respective configurations of the individual sections of the portable terminal 10 with reference to FIG. 1 and (a) of FIG. 2.

(First Electrode 1A and Second Electrode 1B)

The first electrode 1A and the second electrode 1B (hereinafter referred to collectively as "two electrodes" as appropriate) are, as illustrated in (a) of FIG. 2, disposed at respective positions at which a user's hand holding the casing is in contact with the portable terminal 10. The present embodiment is configured such that as illustrated in (a) of FIG. 2, the two electrodes are disposed at, among other opposite side surfaces of the casing, respective side surfaces that are different from the pair of a back surface of the portable terminal 10 and a front surface opposite to the back surface and that are adjacent to the back surface across its long sides. The disposition of the two electrodes is, however, not limited to the above. Further, as illustrated in (a) of FIG. 2, the two electrodes are electrically connected to the sensor microcomputer 2, disposed on the back surface side of the portable terminal 10, through respective conducting wires. The two electrodes, configured as above, are combined with a sensor control section (contact sensor) 21 (see FIG. 1) described later to constitute a contact sensor. The two electrodes are each made of any material that allows a capacitance change to be sensed.

(Sensor Microcomputer 2)

The sensor microcomputer 2 outputs information about a reaction level based on a sensing signal from each of the two electrodes. The sensor microcomputer 2 determines on the basis of the reaction level whether there has been a contact of a hand with at least one of the two electrodes or a separation of a hand from at least one of the two electrodes, and notifies the host control section 3 of the determination result. The sensor microcomputer 2 controls the cycle of determining whether there has been a contact of a hand or a separation of a hand (hereinafter referred to simply as "determination cycle") so that the cycle is longer or shorter. The sensor microcomputer 2, to perform that function, includes a sensor control section 21, a determining unit (determining section) 22, a determination period control unit (determination period control section) 23, and a notifying section 24.

The sensor control section 21 measures the capacitance between the first electrode 1A and the second electrode 1B. Specifically, the sensor control section 21 outputs, to the determining unit 22 as information about a reaction level based on the two electrodes, information about the absolute value of the difference between (i) a sensing signal for a case where there has been no capacitance increase caused by a contact of a hand (that is, a case where there has been no contact of a hand) and (ii) a sensing signal for a case where there has been a capacitance increase caused by a contact of a hand (that is, a case where there has been a contact of a hand). The sensor control section 21 may temporarily store information about a reaction level in the memory section 4.

The determining unit 22 determines on the basis of the reaction level inputted from the sensor control section 21 whether there has been a contact of a hand with at least one of the two electrodes. The determining unit 22 further determines on the basis of the reaction level received from the sensor control section 21 whether there has been a separation of a hand from at least one of the two electrodes.

Figure 3:
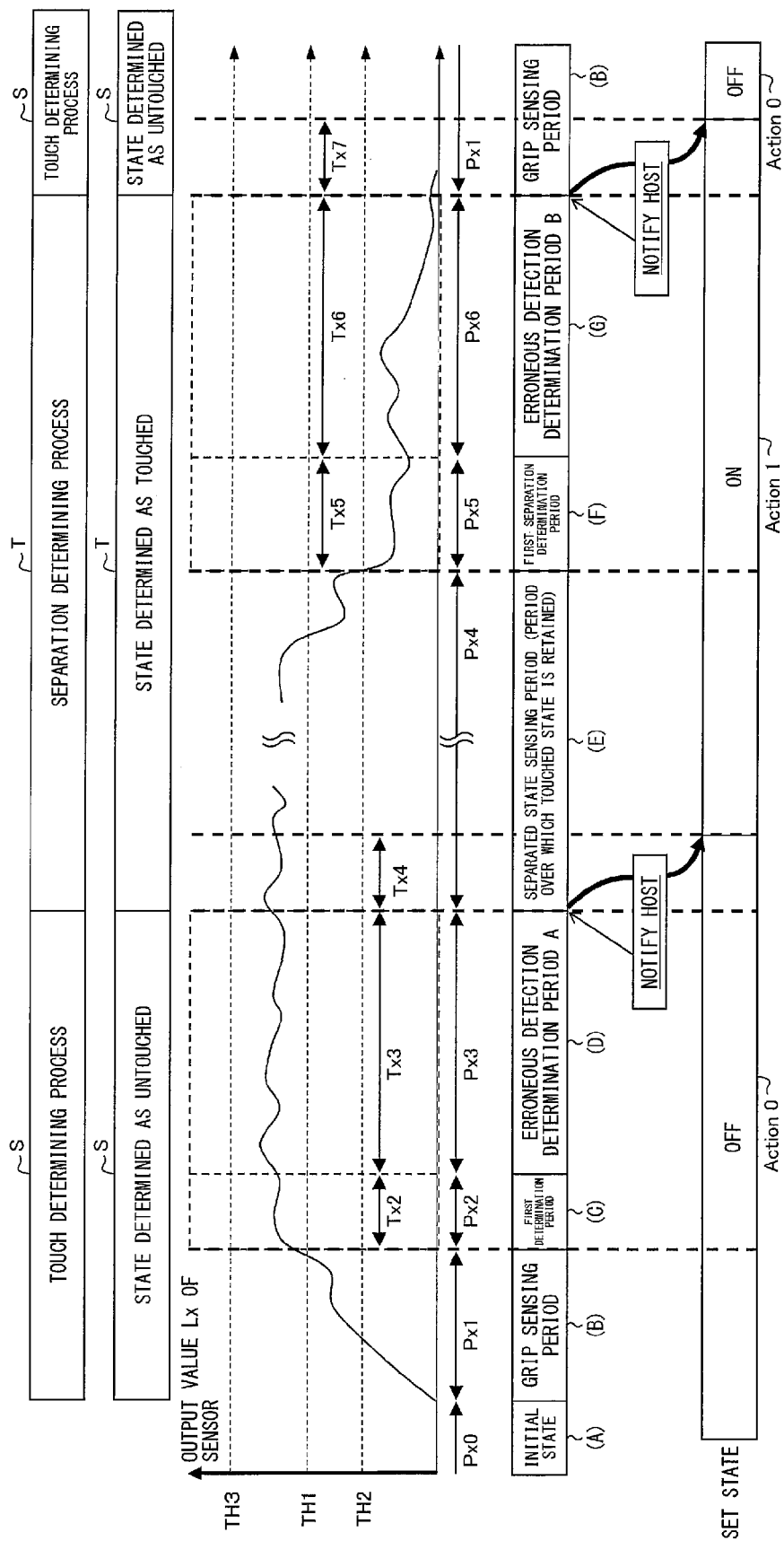
FIG. 3 is a timing chart illustrating a flow of an operation (basic operation) of the portable terminal in accordance with Embodiment 1.

The determination period control unit 23, for example, controls the state of each of the following periods shown in FIG. 3: (B) a grip sensing period (Px1, where x is 0 or 1), (C) a first determination period (Px2), (D) an erroneous detection determination period A (Px3), (E) a separated state sensing period (Px4), (F) a first separation determination period (Px5), and (G) an erroneous detection determination period B (Px6). The determination period control unit 23 performs this control with use of the timer 5. To control the state of each period, the determination period control unit 23 controls, for example, (i) the arrangement of the individual periods over a determination operation, (ii) the length (time) of each period, and (iii) the cycle of a determination operation during each period (determination cycle).

The term "erroneous detection" refers to a grip function (that is, a command executed in response to a grip or release) becoming enabled or disabled unintendedly on a scene (usage case) outside the intention of the user's. More specifically, the term "erroneous detection" refers to a grip function becoming enabled or disabled unintendedly on such scenes as scenes where (i) the portable terminal 10 is in a bag or pocket, (ii) the portable terminal 10 is exposed to wireless noise, and (iii) the portable terminal 10 is in a bathtub (water), around a kitchen, or on a metal table (desk).

As illustrated in FIG. 3, in a case where the determining unit 22 has initially determined that the reaction level (that is, the output value Lx of the sensor shown in FIG. 3) is not less than a threshold (first threshold) TH1, the determination period control unit 23 performs a process of shortening the determination cycle (that is, the cycle of determining a contact of a hand) so that the determination cycle is shorter than before the determination. Further, in a case where the determining unit 22 has initially determined that the reaction level is not greater than a threshold (second threshold) TH2, the determination period control unit 23 performs a process of shortening the cycle of determining a separation of a hand so that the cycle is shorter than before the determination. The threshold TH1 is a threshold for use in sensing a contact of a hand with an electrode. The threshold TH2 is a threshold for use in sensing a separation of a hand from an electrode. The threshold TH3 is a threshold for use in sensing an erroneous detection (for example, a case where water is in contact with an electrode). The threshold TH3 is not so relevant to the essence of the present invention, and is not described herein.

The notifying section 24 outputs as an interrupt (INT) the result of the determination by the determining unit 22 to notify the host control section 3 (specifically, an instruction identifying section 31 described later) of the determination result.

(Host Control Section 3)

The host control section 3 is a host processor (central processing unit: CPU) for the device (for example, the portable terminal 10 illustrated in FIG. 2), and performs overall control (processes) of the device. The host control section 3, as illustrated in FIG. 1, transmits a control signal to the sensor microcomputer 2 as necessary to control the overall operation of the sensor microcomputer 2.

In particular, the host control section 3 of the present embodiment receives from the sensor microcomputer 2 the result of determination of whether there has been a contact of a hand with at least one of the two electrodes or a separation of a hand from at least one of the two electrodes. The host control section 3 further identifies on the basis of the determination result received from the sensor microcomputer 2 a process corresponding to the determination result (in the present embodiment, a process of causing the display section [not shown in the drawings] to start displaying an image or stop displaying an image), and notifies a process performing section 32 of the identification result. The process performing section 32, on the basis of the process identification result received from the instruction identifying section 31, transmits a command to each control block of the portable terminal 10 (for example, a display control section [not shown in the drawings] configured to control the display section) for execution of the process identified. The present embodiment is described as involving two kinds of commands shown in FIG. 3, namely, Action 0 (for causing the display section [not shown in the drawings] to stop displaying an image) and Action 1 (for causing the display section to start displaying an image). The present embodiment is, however, not limited to such a configuration.

(Memory Section 4)

The memory section 4 stores in advance various information items necessary for each control block of the sensor microcomputer 2 to perform a predetermined process, or temporarily records such various information items during the predetermined process. The memory section 4 stores in advance various information items such as period setting data, information about the determination cycle, the reaction level, the thresholds, and the determination result, or temporarily records such various information items in correspondence with an operation described later of the portable terminal 10 described above. The period setting data is setting data for use in controlling the state of each of the following periods shown in FIG. 3: a grip sensing period (Px1), a first determination period (Px2), an erroneous detection determination period A (Px3), a separated state sensing period (Px4), a first separation determination period (Px5), and an erroneous detection determination period B (Px6). The determination cycle is a cycle of a plurality of processes of comparing a reaction level outputted from the sensor control section 21 with the threshold TH1 or threshold TH2 to determine whether there has been a contact of a hand or a separation of a hand.

Embodiment 1: Basic Operation of Portable Terminal 10

The description below deals in detail with a basic operation of the portable terminal 10 (that is, a case involving a single electrode) with reference to FIG. 3. FIG. 3 is a timing chart illustrating a flow of a basic operation of the portable terminal 10. When the portable terminal 10 has been activated, it is in an (A) "initial state". In a case where the sensor microcomputer 2 has started an operation of the sensor section, the operation period transitions to the (B) "grip sensing period", which starts the "determination period".

The portable terminal 10 is configured to be capable of performing a plurality of scans (determinations) over the "determination period", as it is difficult through only one scan to determine whether a contact of a hand has been erroneously detected or a hand has actually come into contact with the electrode. The "determination period" above is further roughly divided into a period S and a period T both shown in FIG. 3. The period S is a period during which the portable terminal 10 performs a "touch determining process", that is, a process through which the portable terminal 10 determines whether there has been a contact of a hand with the electrode. The period T is a period during which the portable terminal 10 performs a "separation determining process", that is, a process through which the portable terminal 10 determines whether there has been a separation of a hand from the electrode.

The period S is further roughly divided into a (C) "first determination period (Px2)" and a (D) "erroneous detection determination period A (Px3)". The period T is roughly divided into an (F) "first separation determination period (Px5)" and a (G) "erroneous detection determination period B (Px6)". In a case where four patterns can be set for the respective periods (C), (D), (F), and (G) above of the "determination period", it is possible to change as appropriate each of (i) the time period spent before the portable terminal 10 senses a contact of a hand and (ii) the time period spent before the portable terminal 10 senses a separation of a hand. Thus, setting the length of each period above for the intended use improves the user's convenience. When the period (D) ends, the operation period transitions to an (E) "separated state sensing period (Px4)", which starts the period T. The description below deals in detail with the individual periods (B) to (G) above.

The period (B) "grip sensing period (Px1)" is a period spent before the portable terminal 10 initially senses a contact of a hand, and is a period during which the output value Lx of the sensor is below the threshold TH1. In a case where the output value Lx of the sensor has initially exceeded the threshold TH1 (or become not less than the threshold TH1) during the period (B), the operation period transitions to the period (C).

The period (C) "first determination period (Px2)" is a period for a tentative detection of a contact of a hand. In a case where the output value Lx of the sensor has remained not less than the threshold THx1 over a predetermined time Tx2 or longer, the portable terminal 10 determines that there has been a contact of a hand. The operation period then transitions to the period (D). The time Tx2 is defined by the number of determinations and determination cycle that are preset for the period (C).

The period (D) "erroneous detection determination period A (Px3)" is a period for reconfirming a tentative detection. In a case where the output value Lx of the sensor has remained not less than the threshold THx1 continuously over a set time Tx3 or greater after the period (C), the portable terminal 10 notifies the host control section 3 that the portable terminal 10 has sensed a contact of a hand (that the tentative detection is not an erroneous detection). The time Tx3 is defined by the number of determinations and determination cycle that are preset for the period (D). FIG. 3 also shows a time Tx4, which indicates a time lag between (i) a time point at which the portable terminal 10 determines that there has been a contact of a hand with the electrode and (ii) a later time point at which the display section starts to display an image (Action 0).

The period (E) "separated state sensing period (Px4)" is a period during which the portable terminal 10 retains a state of a contact of a hand as an internal state, in other words, a period spent before the portable terminal 10 senses a separation of a hand. The period (E) follows the period (D), and is a period spent before the output value Lx of the sensor initially falls below a threshold THx2 (or becomes not greater than the threshold THx2). In a case where the output value Lx of the sensor has initially fallen below the threshold TH2 during the period (E), the operation period transitions to the period (F).

The period (F) "first separation determination period (Px5)" is a period for a tentative detection of a separation of a hand. In a case where the output value Lx of the sensor has remained not greater than the threshold THx2 over a predetermined time Tx5 or longer, the portable terminal 10 determines that there has been a separation of a hand. The operation period then transitions to the period (G).

The period (G) "erroneous detection determination period B (Px6)" is a period for reconfirming a tentative detection. In a case where the output value Lx of the sensor has remained not greater than the threshold THx2 continuously over a set time Tx6 or greater after the period (F), the portable terminal 10 notifies the host control section 3 that the portable terminal 10 has sensed a separation of a hand (that the tentative detection is not an erroneous detection). The time Tx6 is defined by the number of determinations and determination cycle that are preset for the period (G). FIG. 3 also shows a time Tx7, which indicates a time lag between (i) a time point at which the portable terminal 10 determines that there has been a separation of a hand from the electrode and (ii) a later time point at which the display section stops displaying an image (Action 1).

The present embodiment performs, through the individual periods, a scan operation roughly divided into four kinds: a "normal scan" during the period (B), a "high-speed scan" during the periods (C) and (D), a "low-speed scan" during the period (E), and a "high-speed scan 2" during the periods (F) and (G). The "normal scan" has a scan cycle (determination cycle) longer than the determination cycle of the "high-speed scan". The "low-speed scan" has a determination cycle longer than the determination cycle of the "high-speed scan 2". As more specific examples, the present embodiment performs (i) a constant scan at a 60-ms cycle (the time interval is 120 ms) during the "first determination period", (ii) a constant scan at a 50-ms cycle (the time interval is 50 ms) during the "erroneous detection determination period A", (iii) a constant scan at a 120-ms cycle (the time interval is 240 ms) during the "first separation determination period", and (iv) a constant scan at an 80-ms cycle (the time interval is, for example, 320 ms) during the "erroneous detection determination period B".

With the above configuration, the determination cycle is shortened only in a case where the output value Lx of the sensor is not less than the threshold TH1 or not greater than the threshold THx2. The above configuration can thus reduce power consumption more effectively than any technique in which the determination cycle is continuously short in a case where there has been a contact of a hand with a contact sensor. Further, the above configuration allows a process during the above erroneous detection determination period B to be performed early once the portable terminal 10 has sensed (i) a gripped state (that is, a state in which the portable terminal 10 is being held) or (ii) a state of a grip being explained (that is, a state in which the portable terminal 10 has been released). The above configuration thus allows the host control section 3 to be notified early through a high-speed scan once there has been a reaction (improved operability). A constant high-speed scan will undesirably shorten the scan interval, with the result of increased current consumption. The above control, on the other hand, minimizes the scan cycle while the portable terminal 10 is waiting for a reaction, with the result of reduced current consumption.

[Variation]

The determination period control unit 23 described above may perform a process of, in a case where the output value Lx of the sensor is not less than the threshold THx1, shortening the cycle of determining a contact of a hand so that the cycle is shorter than in a case where the output value Lx of the sensor is less than the threshold THx1. Further, the determination period control unit 23 may perform a process of, in a case where the output value Lx of the sensor is not greater than the threshold THx2, shortening the cycle of determining a separation of a hand so that the cycle is shorter than in a case where the output value Lx of the sensor is greater than the threshold THx2.

With the above configuration, the determination cycle is shortened only in a case where the output value Lx of the sensor is not less than the threshold THx1 or not greater than the threshold THx2. The above configuration can thus reduce power consumption more effectively than any technique in which the determination cycle is continuously short in a case where there has been a contact of a hand with a contact sensor.

Embodiment 2: Applied Operation of Portable Terminal 10 (No. 1)

Figure 4:
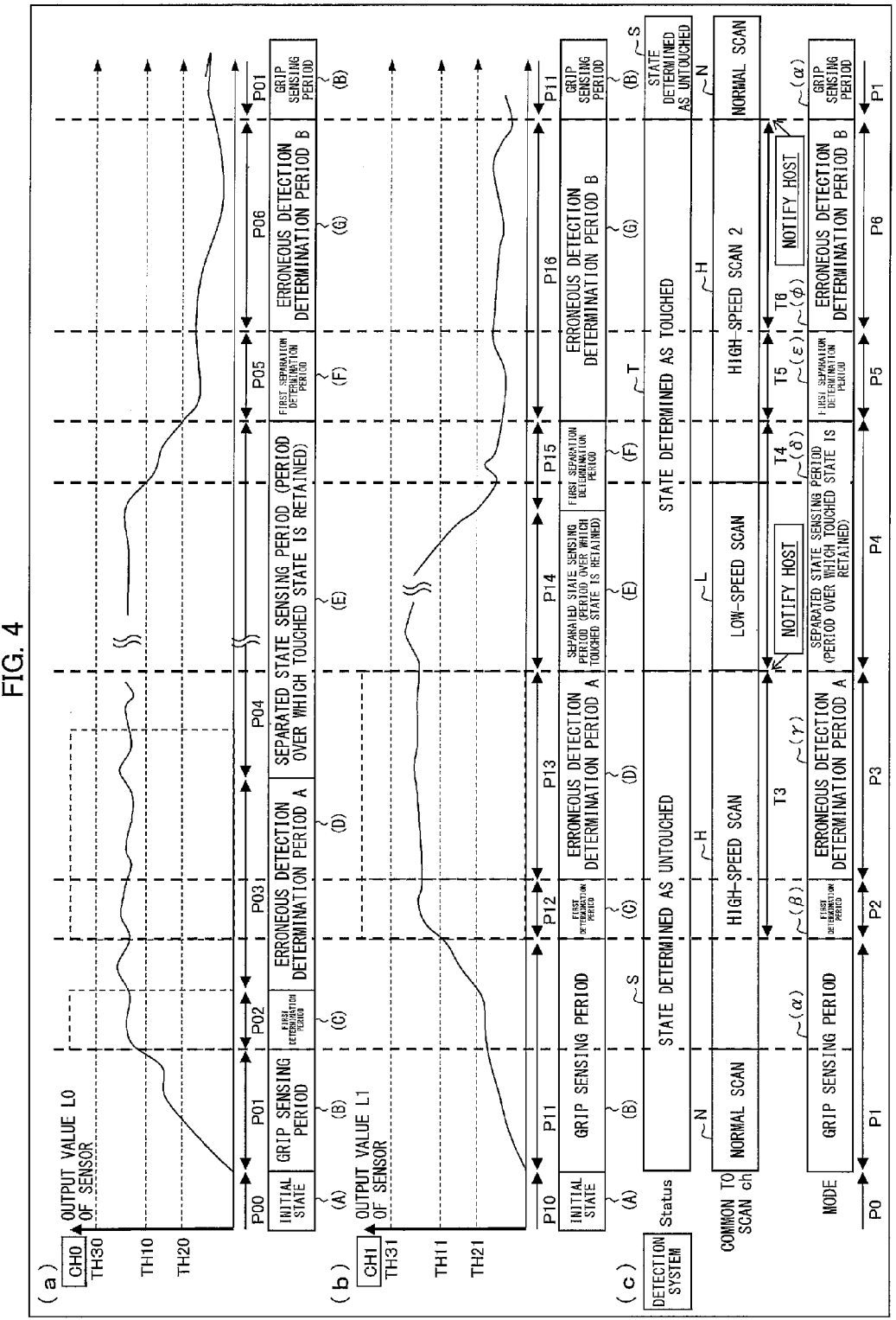
FIG. 4 is a timing chart illustrating a flow of an operation (applied operation) of the portable terminal in accordance with Embodiment 2.

The description below deals with an applied operation of the portable terminal 10 (that is, a case involving two electrodes: No. 1) with reference to FIG. 4. FIG. 4 is a timing chart illustrating a flow of an applied operation (No. 1) of the portable terminal 10. The description below uses (i) the term "Channel 0 (CH0)" to refer to an operation of one of a first electrode 1A and a second electrode 1B and (ii) the term "Channel 1 (CH1)" to refer to an operation of the other.

The portable terminal 10 (system) of the present embodiment performs an operation (mode) that combines sensing of a grip by the first electrode 1A with sensing of a grip by the second electrode 1B. The present embodiment is configured such that in a case where each of the two electrodes, namely the first electrode 1A and the second electrode 1B, has sensed a contact of a hand, the portable terminal 10 determines that the user has started to grip (hold) the casing and that in a case where each of the two electrodes, namely the first electrode 1A and the second electrode 1B, has sensed a separation of a hand, the portable terminal 10 determines that the user has stopped gripping (released) the casing.

The present embodiment is configured such that as illustrated in FIG. 4, (i) the S period starts at the start of the (B) grip sensing period (P01) for CH0 and ends at the end of the (D) erroneous detection determination period A (P13) for CH1 and (ii) the T period starts at the start of the (E) separated state sensing period (P14) for CH1 and ends simultaneously with the end of the (G) erroneous detection determination period B (P06) for CH0 and the end of the (G) erroneous detection determination period B (P16) for CH1. This means that the next (B) grip sensing period starts at the same time point for both CH0 and CH1.

The present embodiment performs, through the individual periods, a scan operation roughly divided into three kinds. For instance, the present embodiment performs (i) a normal scan (N) during the period P01 for CH0, (ii) a high-speed scan (H) from the start of the period P02 for CH0 until the end of the period P13 for CH1, (iii) a low-speed scan (L) from the start of the period P14 for CH1 until a time point during the period P15 for CH1, and (iv) a high-speed scan 2 (H) from the time point during the period P15 for CH1. The high-speed scan 2 (H) ends simultaneously with the respective ends of the period P06 for CH0 and the period P16 for CH1. The scan operation then returns to the normal scan (N).

The normal scan, the high-speed scan, the low-speed scan, and the high-speed scan 2 are performed at respective cycles of ams, bms, cms, and dms, and have respective operating currents of $I_a\mu$ A, $I_b\mu$ A, $I_c\mu$ A, and $I_d\mu$ A. The portable terminal 10 is operated in such a manner as to satisfy, for example, the conditions a>b and c>d (where $I_a<I_b$ and $I_c<I_d$).

FIG. 4 shows periods ($\alpha$) to ($\phi$), which are substantial operation (mode) periods for the entire system of the present embodiment. The period ($\alpha$) is a period spent before a channel (hereinafter referred to as "CH") out of the two CHs for which CH a contact of a hand is later transitions to the first determination period. In a case where during the period ($\beta$), the output value of the sensor has remained not less than the threshold TH$x$1 over a time period or longer for the CH out of the two CHs for which CH a contact of a hand is later, the operation period transitions to the erroneous detection determination period A for a grip determination. This is, however, on the precondition that the operation period has already transitioned to the erroneous detection determination period A for a CH for which a contact of a hand is earlier. In a case where during the period ($\gamma$), the output value of the sensor has remained not less than the threshold TH$x$1 continuously over a predetermined time period or longer after the period ($\beta$) for each of the CHs, the portable terminal 10 notifies the host control section 3 that the portable terminal 10 has sensed a grip. The period ($\delta$) is a period spent before the portable terminal 10 initially senses a separation of a hand. For each of the CHs, the period ($\delta$) follows the period ($\gamma$), and is a period during which (i) the output value of the sensor remains not less than the threshold TH$x$2 and (ii) the portable terminal 10 retains a continued state of a grip as an internal state. In a case where during the period ($\epsilon$), the output value of the sensor has remained not greater than the threshold TH$x$2 over a set time period or longer for a CH out of the two CHs for which CH a separation of a hand is later, the operation period transitions to the erroneous detection determination period B to determine whether the user has stopped gripping the casing. This is, however, on the precondition that the operation period has already transitioned to the erroneous detection determination period B for a CH for which a separation of a hand is earlier. In a case where during the period ($\phi$), the output value of the sensor has remained not greater than the threshold TH$x$2 continuously over a set time period or longer after the period ($\epsilon$) for each of the CHs, the portable terminal 10 determines that the portable terminal 10 has detected that the user has stopped gripping the casing, and notifies the host control section 3 of the determination result.

The present embodiment is configured such that the condition for the portable terminal 10 to notify the host control section 3 of an interrupt indicative of a grip having been performed is such that the output value L0 of the sensor≥the threshold TH10 and the output value of the sensor L1≥the threshold TH11 continuously over a time T3. The present embodiment is also configured such that the condition for the portable terminal 10 to notify the host control section 3 of an interrupt indicative of a grip having been stopped is such that the output value L0 of the sensor≤the threshold TH20 and the output value of the sensor L1≤the threshold TH21 continuously over a time T6.

Figure 5:
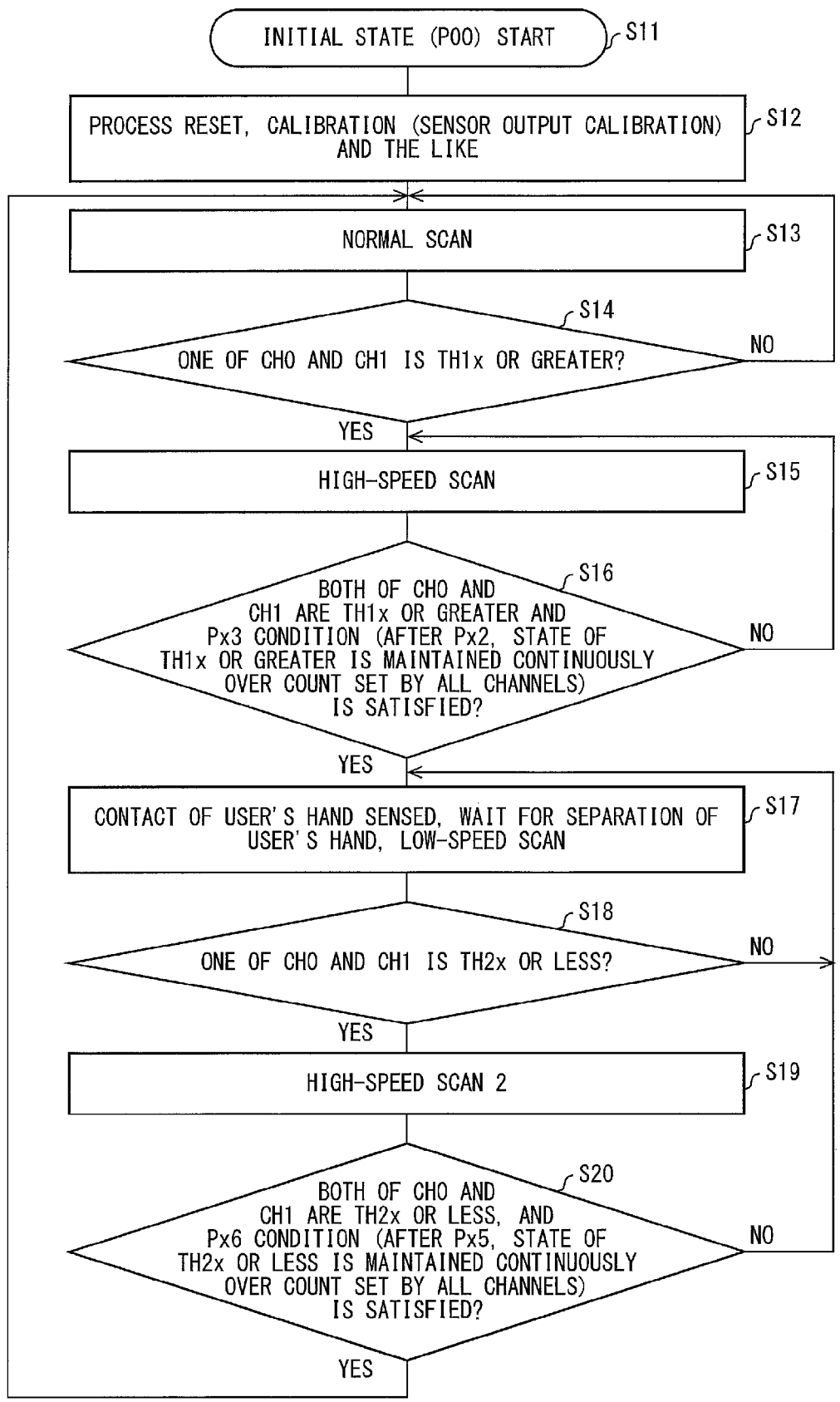
FIG. 5 is a flowchart illustrating a flow of an operation (applied operation) of the portable terminal in accordance with Embodiment 2.

The description below deals with a flow of an operation of the present embodiment with reference to the flowchart of FIG. 5. FIG. 5 is a flowchart each illustrating a flow of the applied operation (No. 1) of the portable terminal 10.

In S11, activating the portable terminal 10 causes the initial state (P00) to start. The operation then proceeds to S12. In S12, the sensor microcomputer 2 resets the process and performs calibration (sensor output calibration) and the like. The operation then proceeds to S13.

In S13, the determination period control unit 23 sets the determination operation to the normal scan (or maintains the normal scan). The operation then proceeds to S14. In S14, the determining unit 22 determines whether "ONE OF CH0 AND CH1 IS TH1$x$ OR GREATER?". If one of the two CHs is not less than TH1$x$, the operation proceeds to S15 (YES). If both of the two CHs are less than TH1$x$, the operation returns to S13 (NO).

In S15, the determination period control unit 23 sets the determination operation to the high-speed scan (or maintains the high-speed scan). The operation then proceeds to S16. In S16, the determining unit 22 determines whether "BOTH OF CH0 AND CH1 ARE TH1$x$ OR GREATER AND P$x$3 CONDITION (AFTER P$x$2, STATE OF TH1$x$ OR GREATER IS MAINTAINED CONTINUOUSLY OVER COUNT SET BY ALL CHANNELS) IS SATISFIED?". If this condition is satisfied, the operation proceeds to S17 (YES). If the condition is not satisfied, the operation returns to S15.

In S17, the determining unit 22 senses a contact of a hand of the user's (grip), and the notifying section 24 then notifies the instruction identifying section 31 of the host control section 3 of the sensing result. Then, the determining unit 22 waits for a separation of the hand of the user's, and the determination period control unit 23 sets the determination operation to the low-speed scan (or maintains the low-speed scan). The operation then proceeds to S18. The instruction identifying section 31 notifies the process performing section 32 of the display section having started to display an image, and the process performing section 32 then transmits a command to each control block. In S18, the determining unit 22 determines whether "ONE OF CH0 AND CH1 IS TH2$x$ OR LESS?". If one of the two CHs is not greater than TH2$x$, the operation proceeds to S19 (YES). If both of the two CHs are above the threshold TH$x$2, the operation returns to S17 (NO).

In S19, the determination period control unit 23 sets the determination operation to the high-speed scan 2 (or maintains the high-speed scan 2). The operation proceeds to S20. In S20, the determining unit 22 determines whether "BOTH OF CH0 AND CH1 ARE TH2$x$ OR LESS, AND Px6 CONDITION (AFTER Px5, STATE OF TH2$x$ OR LESS IS MAINTAINED CONTINUOUSLY OVER COUNT SET BY ALL CHANNELS) IS SATISFIED?". If this condition is satisfied, the operation returns to S13 (YES). Then, the determining unit 22 senses a separation of the hand of the user's (stopping of the grip), and the notifying section 24 then notifies the instruction identifying section 31 of the host control section 3 of the sensing result. The instruction identifying section 31 notifies the process performing section 32 of the display section having stopped displaying an image, and the process performing section 32 then transmits a command to each control block. In S20, if the above condition is not satisfied, the operation returns to S17.

The system of the present embodiment is configured to perform a high-speed scan after a hand has touched the electrode for one of the two CHs. This configuration allows the host control section 3 to be notified earlier in a case where a hand has touched the electrode for the other CH (that is, a hand has touched both the CHs). The system of the present embodiment is configured to sense a grip having been stopped (that is, a hand having been separated) through the low-speed scan for a slower reaction because quickness of a response (that is, the time period spent after a separation of a hand until the function is disabled) is usually not wanted so much as for a touch in view of such cases as a case of dimming a displayed image and a case of transitioning to another process.

Embodiment 3: Applied Operation of Portable Terminal 10 (No. 2)

Figure 6:
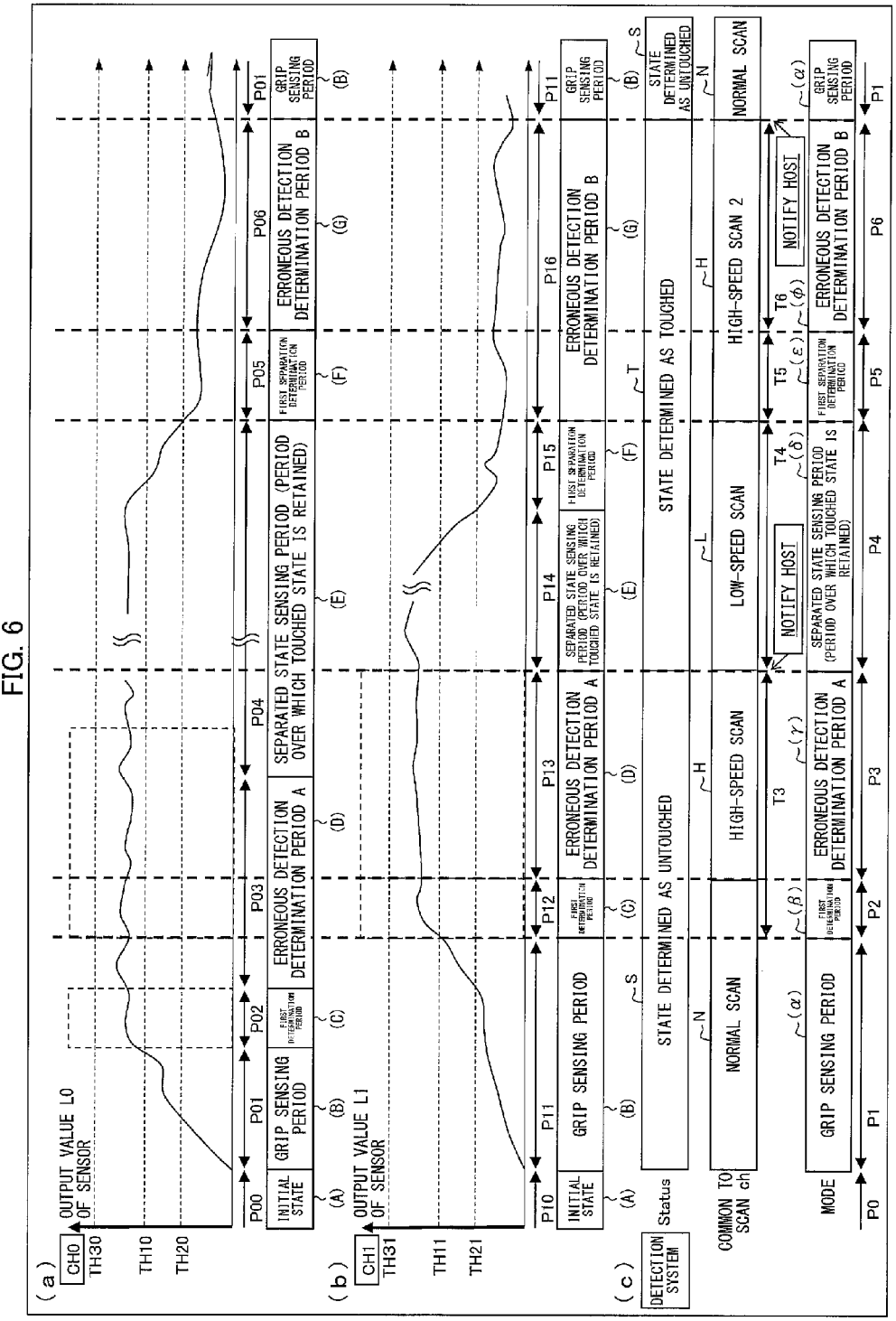
FIG. 6 is a timing chart illustrating a flow of an operation (applied operation) of the portable terminal in accordance with Embodiment 3.

The description below deals with an applied operation of the portable terminal 10 (that is, a case involving two electrodes: No. 2) with reference to FIG. 6. FIG. 6 is a timing chart illustrating a flow of an applied operation (No. 2) of the portable terminal 10. The present embodiment differs from Embodiment 2 in that the present embodiment is configured as follows: As illustrated in FIG. 6, a mere contact of a hand with the electrode for one of the two CHs does not cause the operation period to transition to the high-speed scan, but only a contact of a hand with the respective electrodes for both the CHs can cause the operation period to transition to the high-speed scan. The operation period then transitions to the erroneous detection determination period B. After that, the portable terminal 10 notifies the host control section 3. The present embodiment is substantially similar to Embodiment 2 about the other part of the operation. Such other part is thus not described here in detail.

Figure 7:
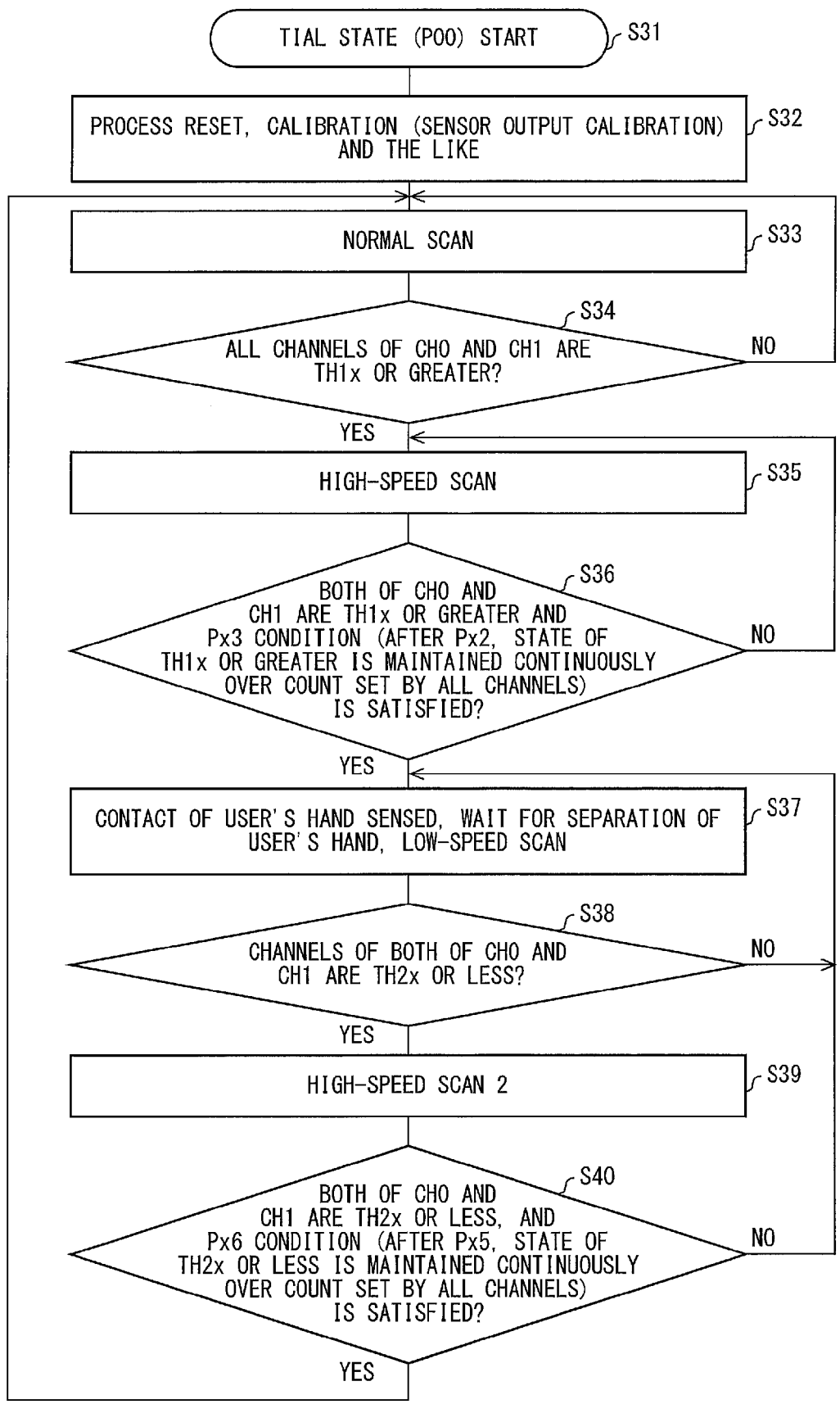
FIG. 7 is a flowchart illustrating a flow of an operation (applied operation) of the portable terminal in accordance with Embodiment 3.

The description below deals with a flow of an operation of the present embodiment with reference to the flowchart of FIG. 7. FIG. 7 is a flowchart illustrating a flow of the applied operation (No. 2) of the portable terminal 10. The steps S31 to S33, S35 to S37, S39 and S40 are substantially identical to the steps S11 to S13, S15 to S17, S19, and S20 described above, and are not described here.

In S34, the determining unit 22 determines whether "ALL CHANNELS OF CH0 AND CH1 ARE TH1$x$ OR GREATER?". If both of the two CHs are not less than TH1$x$, the operation proceeds to S35 (YES). If both of the two CHs are less than TH1$x$, the operation returns to S33 (NO). In S38, the determining unit 22 determines whether "CHANNELS OF BOTH OF CH0 AND CH1 ARE TH2$x$ OR LESS?". If both of the two CHs are not greater than TH2$x$, the operation proceeds to S39 (YES). If either of the two CHs exceeds the threshold THx2 again, the operation returns to S37 (NO). The present embodiment has a reaction time (that is, the time period spent after a touch of a hand until the function becomes enabled or the time period spent after a separation of a hand until the function becomes disabled) longer than that of Embodiment 2, but is less subject to an erroneous detection of chattering or the like.

The present embodiment, which is configured such that only a contact of a hand with the respective electrodes for both the CHs can cause the operation period to transition to the high-speed scan, performs the high-speed scan over a shorter period. This configuration can reduce current consumption further than Embodiment 2.

Embodiment 4: Software Implementation Example

Control blocks of the portable terminal 10 (particularly, the determining unit 22, the determination period control unit 23, and the notifying section 24) may be realized by a logic circuit (hardware) on an integrated circuit (IC chip) or may be realized by software as executed by a CPU.

In the latter case, the portable terminal 10 includes: a CPU that executes instructions of a program that is software realizing the foregoing functions; a read only memory (ROM) or storage device (each referred to as "storage medium") storing the program and various kinds of data in such a form that they are readable by a computer (or a CPU); and a random access memory (RAM) that develops the program in executable form. The object of the present invention can be achieved by a computer (or a CPU) reading and executing the program stored in the storage medium. The storage medium may be "a non-transitory tangible medium" such as a tape, a disk, a card, a semiconductor memory, and a programmable logic circuit. Further, the program may be supplied to or made available to the computer via any transmission medium (such as a communication network and a broadcast wave) which enables transmission of the program. Note that the present invention can also be implemented by the program in the form of a computer data signal embedded in a carrier wave which is embodied by electronic transmission.

Embodiment 5: Variation

Further, the present invention may be configured such that the method of Embodiment 1 above is applied to a contact of a hand, whereas the method of Embodiment 2 above is applied to a separation of a hand. In this case, the step S18 shown in the flowchart of FIG. 5 may simply be replaced with S38 shown in the flowchart of FIG. 7, for example. The other part of the operation has a flow as described above, and is not described here.

Alternatively, the present invention may be configured conversely such that the method of Embodiment 2 above is applied to a contact of a hand, whereas the method of Embodiment 1 above is applied to a separation of a hand. In this case, the step S14 shown in the flowchart of FIG. 5 may simply be replaced with S34 shown in the flowchart of FIG. 7, for example. The other part of the operation has a flow as described above, and is not described here.

[Recap]

A portable terminal (portable terminal 10) according to a first aspect of the present invention is a portable terminal including: at least one contact sensor (first electrode 1A, second electrode 1B, sensor control section 21) disposed at a position with which a hand of a user's comes into contact in a case where the hand holds a casing of the portable terminal; a determining section (determining unit 22) configured to perform, a plurality of times, a process of determining whether a sensing signal output from the at least one contact sensor has an absolute value (reaction level) of (i) not less than a first threshold (TH1$x$) for determining a contact of a hand or (ii) not greater than a second threshold (TH2$x$) for determining a separation of a hand; and a determination period control section (determination period control unit 23) configured to perform either (i) a process of, in a case where the determining section has initially determined that the absolute value of the output is not less than the first threshold, shortening a first cycle of the determination of a contact of a hand so that the first cycle is shorter than before the initial determination or (ii) a process of, in a case where the determining section has initially determined that the absolute value of the output is not greater than the second threshold, shortening a second cycle of the determination of a separation of a hand so that the second cycle is shorter than before the initial determination.

A method according to a sixth aspect of the present invention for controlling a portable terminal is a method for controlling a portable terminal including at least one contact sensor disposed at a position with which a hand of a user's comes into contact in a case where the hand holds a casing of the portable terminal, the method including the steps of: (a) performing, a plurality of times, a process of determining whether a sensing signal output from the at least one contact sensor has an absolute value of (i) not less than a first threshold for determining a contact of a hand or (ii) not greater than a second threshold for determining a separation of a hand; and (b) performing either (i) a process of, in a case where the step (a) has initially determined that the absolute value of the output is not less than the first threshold, shortening a first cycle of the determination of a contact of a hand so that the first cycle is shorter than before the initial determination or (ii) a process of, in a case where the step (a) has initially determined that the absolute value of the output is not greater than the second threshold, shortening a second cycle of the determination of a separation of a hand so that the second cycle is shorter than before the initial determination.

With the above configuration or method, the determining section or step (a) performs, a plurality of times, a process of determining whether a sensing signal output from the at least one contact sensor has an absolute value of (i) not less than a first threshold for determining a contact of a hand or (ii) not greater than a second threshold for determining a separation of a hand. The above configuration or method can thus prevent erroneous detections further than any technique involving such a determining process only once.

Further, with the above configuration or method, the determination period control unit or step (b) performs either (i) a process of, in a case where the determining section or step (a) has initially determined that the absolute value of the sensing signal output is not less than a first threshold, shortening a first cycle of the determination of a contact of a hand so that the first cycle is shorter than before the initial determination or (ii) a process of, in a case where the determining section or step (a) has initially determined that the absolute value of the sensing signal output is not greater than a second threshold, shortening a second cycle of the determination of a separation of a hand so that the second cycle is shorter than before the initial determination. The above configuration or method can thus increase the speed of a response of the terminal to an operation over any technique involving no such shortening process. Further, with the above configuration or method, only in a case where the determining section or step (a) has initially determined that the absolute value of the sensing signal output is not less than the first threshold or in a case where the determining section or step (a) has initially determined that the absolute value of the sensing signal output is not greater than the second threshold, the determination cycle is shortened so that the determination cycle is shorter than before the initial determination. Thus, with the above configuration or method, the cycle of a period during which the determination cycle is not shortened can be longer than the cycle of a period during which the determination cycle is shortened. This can reduce the period during which the determination cycle is not shortened, and can reduce power consumption. Therefore, the above configuration or method can provide a portable terminal that has reduced the number of erroneous detections, consumes less power, and responds quickly to an operation.

In a second aspect of the present invention, a portable terminal is arranged such that, in the first aspect of the present invention, the at least one contact sensor includes a plurality of contact sensors disposed at respective positions with which the hand of the user's comes into contact in the case where the hand holds the casing; and the determination period control section is configured to perform a process of, in a case where the determining section has initially determined that respective sensing signal outputs from all of the plurality of contact sensors each have an absolute value of not less than the first threshold, shortening a third cycle so that the third cycle is shorter than before the initial determination, the third cycle being a cycle of determining whether the respective absolute values of the outputs are each not less than the first threshold.

The above configuration makes it possible to more accurately determine whether the casing of the portable terminal is being held.

In a third aspect of the present invention, a portable terminal is arranged such that, in the first aspect of the present invention, the at least one contact sensor includes a plurality of contact sensors disposed at respective positions with which the hand of the user's comes into contact in the case where the hand holds the casing; and the determination period control section is configured to perform a process of, in a case where the determining section has initially determined that respective sensing signal outputs from all of the plurality of contact sensors each have an absolute value of not greater than the second threshold, shortening a third cycle so that the third cycle is shorter than before the initial determination, the third cycle being a cycle of determining whether the respective absolute values of the outputs are each not greater than the second threshold.

The above configuration makes it possible to more accurately determine whether the casing of the portable terminal is not being held.

In a fourth aspect of the present invention, a portable terminal is arranged such that, in the first aspect of the present invention, the at least one contact sensor includes a plurality of contact sensors disposed at respective positions with which the hand of the user's comes into contact in the case where the hand holds the casing; the determining section is configured to perform, a plurality of times, a process of determining whether a sensing signal output from at least one of the plurality of contact sensors has an absolute value of not less than the first threshold; and the determination period control section is configured to perform a process of, in a case where the determining section has initially determined that the absolute value of the output from at least one of the plurality of contact sensors is not less than the first threshold, shortening a third cycle so that the third cycle is shorter than before the initial determination, the third cycle being a cycle of determining whether the absolute value of the output from at least one of the plurality of contact sensors is not less than the first threshold.

The above configuration makes it possible to more accurately determine whether a hand has come into contact with at least one contact sensor.

In a fifth aspect of the present invention, a portable terminal is arranged such that, in the first aspect of the present invention, the at least one contact sensor includes a plurality of contact sensors disposed at respective positions with which the hand of the user's comes into contact in the case where the hand holds the casing; the determining section is configured to perform, a plurality of times, a process of determining whether a sensing signal output from at least one of the plurality of contact sensors has an absolute value of not greater than the second threshold; and the determination period control section is configured to perform a process of, in a case where the determining section has initially determined that the absolute value of the output from at least one of the plurality of contact sensors is not greater than the second threshold, shortening a third cycle so that the third cycle is shorter than before the initial determination, the third cycle being a cycle of determining whether the absolute value of the output from at least one of the plurality of contact sensors is not greater than the second threshold.

The above configuration makes it possible to more accurately determine whether a hand has become separated from at least one contact sensor.

In a seventh aspect of the present invention, a portable terminal is arranged such that, in the first aspect of the present invention, the determination period control section is configured to perform either (i) a process of, in a case where the absolute value of the output is not less than the first threshold, shortening the first cycle so that the first cycle is shorter than in a case where the absolute value of the output is less than the first threshold or (ii) a process of, in a case where the absolute value of the output is not greater than the second threshold, shortening the second cycle so that the second cycle is shorter than in a case where the absolute value of the output is greater than the second threshold.

With the above configuration, the determination cycle is shortened only in a case where the absolute value of the sensing signal output is not less than the first threshold or not greater than the second threshold. The above configuration can thus reduce power consumption more effectively than any technique in which the determination cycle is continuously short in a case where there has been a contact of a hand with a contact sensor.

The portable terminal according to each of the embodiments above of the present invention may be in the form of a computer. In this case, the present invention also covers in its scope (i) a control program for a portable terminal which program causes a computer to execute each process of the portable terminal so that the portable terminal is in the form of a computer and (ii) a computer-readable recording medium storing the control program.

The present invention is not limited to the description of the embodiments above, but may be altered in various ways by a skilled person within the scope of the claims. Any embodiment based on a proper combination of technical means disclosed in different embodiments is also encompassed in the technical scope of the present invention.

Further, combining technical means disclosed in different embodiments can provide a new technical feature.

INDUSTRIAL APPLICABILITY

The present invention is applicable to a portable terminal including a contact sensor for sensing a contact or separation of a hand. In particular, the present invention is widely applicable to any of various portable terminals such as mobile telephones, smartphones, and tablet PCs.

REFERENCE SIGNS LIST 1A first electrode (contact sensor)
1B second electrode (contact sensor)
10 portable terminal (portable terminal)
21 sensor control section (contact sensor)
22 determining unit (determining section)
23 determination period control unit (determination period control section)
THx1 threshold (first threshold)
THx2 threshold (second threshold)

The invention claimed is:

1. A portable terminal comprising:
at least one contact sensor disposed at a position with which a hand of a user comes into contact in a case where the hand holds a casing of the portable terminal; and
control circuitry and an associated memory; wherein
the control circuitry performs, a plurality of times, a process of determining whether a sensing signal output from the at least one contact sensor has an absolute value of (i) not less than a first threshold for determining a contact of a hand or (ii) not greater than a second threshold for determining a separation of a hand;
the control circuitry performs either (i) a process of, in a case where the control circuitry has initially determined that the absolute value of the output is not less than the first threshold, shortening a first cycle of the determination of a contact of a hand so that the first cycle is shorter than before the initial determination or (ii) a process of, in a case where the control circuitry has initially determined that the absolute value of the output is not greater than the second threshold, shortening a second cycle of the determination of a separation of a hand so that the second cycle is shorter than before the initial determination;
the at least one contact sensor includes a plurality of contact sensors disposed at respective positions with which the hand of the user comes into contact in the case where the hand holds the casing; and
the control circuitry performs a process of, in a case where the control circuitry has initially determined that respective sensing signal outputs from all of the plurality of contact sensors each have an absolute value of not less than the first threshold, shortening a third cycle so that the third cycle is shorter than before the initial determination, the third cycle being a cycle of determining whether the respective absolute values of the outputs are each not less than the first threshold.

2. A portable terminal comprising:
at least one contact sensor disposed at a position with which a hand of a user comes into contact in a case where the hand holds a casing of the portable terminal; and control circuitry and an associated memory; wherein
the control circuitry performs, a plurality of times, a process of determining whether a sensing signal output from the at least one contact sensor has an absolute value of (i) not less than a first threshold for determining a contact of a hand or (ii) not greater than a second threshold for determining a separation of a hand;
the control circuitry performs either (i) a process of, in a case where the control circuitry has initially determined that the absolute value of the output is not less than the first threshold, shortening a first cycle of the determination of a contact of a hand so that the first cycle is shorter than before the initial determination or (ii) a process of, in a case where the control circuitry has initially determined that the absolute value of the output is not greater than the second threshold, shortening a second cycle of the determination of a separation of a hand so that the second cycle is shorter than before the initial determination;
the at least one contact sensor includes a plurality of contact sensors disposed at respective positions with which the hand of the user comes into contact in the case where the hand holds the casing; and
the control circuitry performs a process of, in a case where the control circuitry has initially determined that respective sensing signal outputs from all of the plurality of contact sensors each have an absolute value of not greater than the second threshold, shortening a third cycle so that the third cycle is shorter than before the initial determination, the third cycle being a cycle of determining whether the respective absolute values of the outputs are each not greater than the second threshold.

3. A portable terminal comprising:
at least one contact sensor disposed at a position with which a hand of a user comes into contact in a case where the hand holds a casing of the portable terminal; and
control circuitry and an associated memory; wherein
the control circuitry performs, a plurality of times, a process of determining whether a sensing signal output from the at least one contact sensor has an absolute value of (i) not less than a first threshold for determining a contact of a hand or (ii) not greater than a second threshold for determining a separation of a hand;
the control circuitry performs either (i) a process of, in a case where the control circuitry has initially determined that the absolute value of the output is not less than the first threshold, shortening a first cycle of the determination of a contact of a hand so that the first cycle is shorter than before the initial determination or (ii) a process of, in a case where the control circuitry has initially determined that the absolute value of the output is not greater than the second threshold, shortening a second cycle of the determination of a separation of a hand so that the second cycle is shorter than before the initial determination;
the at least one contact sensor includes a plurality of contact sensors disposed at respective positions with which the hand of the user's comes into contact in the case where the hand holds the casing;
the control circuitry performs, a plurality of times, a process of determining whether a sensing signal output from at least one of the plurality of contact sensors has an absolute value of not less than the first threshold; and
the control circuitry performs a process of, in a case where the control circuitry has initially determined that the absolute value of the output from at least one of the plurality of contact sensors is not less than the first threshold, shortening a third cycle so that the third cycle is shorter than before the initial determination, the third cycle being a cycle of determining whether the absolute value of the output from at least one of the plurality of contact sensors is not less than the first threshold.

4. A portable terminal comprising:
at least one contact sensor disposed at a position with which a hand of a user comes into contact in a case where the hand holds a casing of the portable terminal; and
control circuitry and an associated memory; wherein
the control circuitry performs, a plurality of times, a process of determining whether a sensing signal output from the at least one contact sensor has an absolute value of (i) not less than a first threshold for determining a contact of a hand or (ii) not greater than a second threshold for determining a separation of a hand;
the control circuitry performs either (i) a process of, in a case where the control circuitry has initially determined that the absolute value of the output is not less than the first threshold, shortening a first cycle of the determination of a contact of a hand so that the first cycle is shorter than before the initial determination or (ii) a process of, in a case where the control circuitry has initially determined that the absolute value of the output is not greater than the second threshold, shortening a second cycle of the determination of a separation of a hand so that the second cycle is shorter than before the initial determination;
the at least one contact sensor includes a plurality of contact sensors disposed at respective positions with which the hand of the user's comes into contact in the case where the hand holds the casing;
the control circuitry performs, a plurality of times, a process of determining whether a sensing signal output from at least one of the plurality of contact sensors has an absolute value of not greater than the second threshold; and
the control circuitry performs a process of, in a case where the control circuitry has initially determined that the absolute value of the output from at least one of the plurality of contact sensors is not greater than the second threshold, shortening a third cycle so that the third cycle is shorter than before the initial determination, the third cycle being a cycle of determining whether the absolute value of the output from at least one of the plurality of contact sensors is not greater than the second threshold.

5. A method for controlling a portable terminal including at least one contact sensor disposed at a position with which a hand of a user comes into contact in a case where the hand holds a casing of the portable terminal, the method comprising:
(a) performing, a plurality of times, a process of determining whether a sensing signal output from the at least one contact sensor has an absolute value of (i) not less than a first threshold for determining a contact of a hand or (ii) not greater than a second threshold for determining a separation of a hand; and
(b) performing either (i) a process of, in a case where the step (a) has initially determined that the absolute value of the output is not less than the first threshold, shortening a first cycle of the determination of a contact of a hand so that the first cycle is shorter than before the initial determination or (ii) a process of, in a case where the step (a) has initially determined that the absolute value of the output is not greater than the second threshold, shortening a second cycle of the determination of a separation of a hand so that the second cycle is shorter than before the initial determination, wherein the at least one contact sensor includes a plurality of contact sensors disposed at respective positions with which the hand of the user comes into contact in the case where the hand holds the casing; and the method further comprises performing a process of shortening a third cycle so that the third cycle is shorter than before the initial determination in a case where it has been initially determined that respective sensing signal outputs from all of the plurality of contact sensors each have an absolute value of not less than the first threshold, the third cycle being a cycle of determining whether the respective absolute values of the outputs are each not less than the first threshold.

\* \* \* \* \*